(12) United States Patent
Nishida et al.

(10) Patent No.: US 9,566,663 B2
(45) Date of Patent: Feb. 14, 2017

(54) LASER PROCESSING METHOD AND LAND LASER PROCESSED PRODUCT

(75) Inventors: Kanji Nishida, Ibaraki (JP); Naoyuki Matsuo, Ibaraki (JP); Atsushi Hino, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 489 days.

(21) Appl. No.: 12/663,185

(22) PCT Filed: Jun. 5, 2008

(86) PCT No.: PCT/JP2008/060390
§ 371 (c)(1),
(2), (4) Date: Dec. 4, 2009

(87) PCT Pub. No.: WO2008/149949
PCT Pub. Date: Dec. 11, 2008

(65) Prior Publication Data
US 2010/0167076 A1    Jul. 1, 2010

(30) Foreign Application Priority Data
Jun. 6, 2007    (JP) ................................ 2007-150558

(51) Int. Cl.
*B23K 26/00*    (2014.01)
*B23K 26/02*    (2014.01)
(Continued)

(52) U.S. Cl.
CPC ............... *B23K 26/02* (2013.01); *B23K 26/38* (2013.01); *B23K 26/402* (2013.01);
(Continued)

(58) Field of Classification Search
CPC ..... B23K 26/02; B23K 26/4065; B23K 26/38; B23K 2203/42; B29C 2793/00; B29C 2793/009; B29C 2791/009
(Continued)

(56) References Cited

U.S. PATENT DOCUMENTS 3,965,328 A * 6/1976 Locke ..................... 219/121.72
4,537,809 A * 8/1985 Ang et al. .................... 428/42.2
(Continued)

FOREIGN PATENT DOCUMENTS

CN    1716544 A    1/2006
EP    1 219 382 A2    7/2002
(Continued)

OTHER PUBLICATIONS

Korean Office Action issued in the corresponding KR Patent Application No. 10-2009-7025177, dated Nov. 30, 2011.
(Continued)

*Primary Examiner* — Michael Trinh
(74) *Attorney, Agent, or Firm* — Sughrue Mion, PLLC

(57) ABSTRACT

There is provided a laser beam processing method in which generation of foreign substances from cut can be suppressed and contamination of a surface of a work can be decreased when performing the processing method using a laser beam on the work made of a polymer material, and a laser processed product. Further, the present invention is to provide a laser beam processing apparatus that is used in the laser beam processing method. The present invention relates to a laser beam processing method for processing the work made of a polymer material using a laser beam, wherein the work is irradiated with a laser beam in a state that the optical axis of the laser beam is tilted in the advancing direction of processing by a prescribed angle with respect to the vertical direction of the work.

1 Claim, 2 Drawing Sheets

(51) Int. Cl.
*B23K 26/38* (2014.01)
*B23K 26/40* (2014.01)

(52) U.S. Cl.
CPC .... *B23K 2203/42* (2015.10); *B29C 2791/009* (2013.01); *B29C 2793/00* (2013.01)

(58) Field of Classification Search
USPC ............ 219/121.67, 121.68, 121.69, 121.61, 219/121.78, 121.72
See application file for complete search history.

(56) References Cited

U.S. PATENT DOCUMENTS

| | | | |
|---|---|---|---|
| 5,059,759 A * | 10/1991 | Kudo et al. ............... | 219/121.78 |
| 6,525,296 B2 * | 2/2003 | Matsushima et al. ... | 219/121.69 |
| 6,620,333 B2 * | 9/2003 | Brusasco ................ | C03C 15/00 134/1 |
| 6,676,878 B2 * | 1/2004 | O'Brien et al. ............. | 264/400 |
| 6,808,197 B2 * | 10/2004 | Bauer et al. ............... | 280/728.3 |
| 6,991,695 B2 * | 1/2006 | Tait et al. ..................... | 156/248 |
| 7,011,512 B2 * | 3/2006 | Evans et al. ............... | 425/174.4 |
| 7,655,289 B2 * | 2/2010 | Hubert .................... | B32B 37/00 428/192 |
| 2003/0193875 A1 * | 10/2003 | Rilum et al. ............. | 369/109.02 |
| 2005/0277270 A1 * | 12/2005 | Yoshikawa et al. .......... | 438/463 |
| 2006/0274418 A1 * | 12/2006 | Hirai ............................ | 359/566 |
| 2007/0277659 A1 * | 12/2007 | Schneider .............. | B23K 26/40 83/73 |

FOREIGN PATENT DOCUMENTS

| | | |
|---|---|---|
| JP | S 60-210388 A | 10/1985 |
| JP | 02-290685 A | 11/1990 |
| JP | 10-305377 A | 11/1998 |
| JP | 2001-262083 A | 9/2001 |
| JP | 2002-079385 A | 3/2002 |
| JP | 2003-043476 * | 2/2003 |
| WO | 94/04744 A1 | 3/1994 |
| WO | 2004/026522 A1 | 4/2004 |

OTHER PUBLICATIONS

Notification of First Office Action, dated Dec. 7, 2011, issued in corresponding Chinese Patent Application No. 200880017639.3.
Japanese Patent Office Action dated Jan. 30, 2012, issued in corresponding JP Application No. 2007-150558.
Machine Translation of JP-A 2002-079385 (previously cited in Japanese).
International Preliminary Report on Patentability dated Dec. 7, 2009.
Korean Office Action dated Jul. 20, 2011.
Decision of Refusal dated Sep. 11, 2012, issued by the Japanese Patent Office in Japanese Patent Application No. 2007-150558.
Office Action dated Aug. 2, 2012, issued in corresponding Chinese Patent Application No. 200880017639.3.
Office Action dated Feb. 17, 2013, issued in Chinese Patent Application No. 200880017639.3.
Notification of Reasons for Refusal issued by the Japanese Patent Office in Application No. 2012-269616 dated Dec. 18, 2013.
European Search Report issued by the European Patent Office in Application No. 08765203.8 dated Dec. 20, 2013.
Decision of Rejection dated Sep. 4, 2013, issued by the State Intellectual Property Office of the People's Republic of China in Chinese Patent Application No. 200880017639.3.
Notification of Reexamination dated Jul. 16, 2014, issued by the State Intellectual Property Office of P.R. China Patent Reexamination Board in Chinese Application No. 200880017639.3.
Office Action dated Jun. 27, 2014, issued by the Intellectual Property Office of Taiwan in Taiwanese Patent Application No. 097121330.
Communication dated Oct. 10, 2014, issued by the State Intellectual Property Office of the People's Republic of China in application No. 200880017639.3.

* cited by examiner

ADVANCING DIRECTION
OF PROCESSING

ADVANCING DIRECTION
OF PROCESSING

LASER PROCESSING METHOD AND LASER PROCESSED PRODUCT

TECHNICAL FIELD

The present invention relates to a laser beam processing method in which a processing process such as cutting is performed on a work made of a polymer material using a laser beam, and a laser processed product that can be obtained with this method. The present invention further relates to a laser beam processing apparatus that is used in the laser beam processing method.

BACKGROUND ART

Methods of cutting a work made of a polymer material are mainly with a blade or a metal mold. In the cutting of a polymer material using a blade or the metal mold, foreign substances from the cut may be generated from the work due to the impact of cutting, and the foreign substances may fall off from the cut surface. Therefore, there has been a necessity to improve the processing accuracy of the cut surface and to improve the quality of the product.

Cutting by a laser beam has been investigated, for example, as a method of cutting to improve the quality of the processed product. Cutting by a laser beam makes it possible to reduce the cut foreign substances generated when the blade, etc. is used. However, with this method, a polymer material that is radiated with the laser beam changes into a gas due to thermal decomposition, and a phenomenon that is similar to an explosion occurs. Also, there is a problem that the generated gas contaminates the surface of the work.

For example, when a laser beam 12 is irradiated from the vertical direction to a work 11 as shown in FIG. 2, a gas 13 that is generated due to the decomposition of the polymer material diffuses in the direction parallel to the surface of the work 11. Therefore, the surface of the work 11 is contaminated by the gas 13.

As disclosed in Patent Document 1, a method has been considered of cutting a work made of metal by irradiating a laser beam from a direction that is tilted by a prescribed angle opposite to the advancing direction of cutting. This method has an effect of improvement for melted substances that attach to the backside of the work. However, the gas that is generated due to the decomposition of the metal advances and diffuses in the direction parallel to the surface of the work as shown in FIG. 3. Therefore, the surface of the work is contaminated even with the method described in Patent Document 1.

A method of cutting is disclosed in Patent Document 2 in which an improvement for melted substances on the backside is investigated by using a work made of a plastic material. However the contamination of the surface of the work cannot be prevented even with this method.

Patent Document 1 Japanese Patent Application Laid-Open No. 02-290685

Patent Document 2 Japanese Patent Application Laid-Open No. 2001-262083

DISCLOSURE OF THE INVENTION

Problems to be Solved by the Invention

The present invention is performed in view of the above-described problem points, and an object is to provide a laser beam processing method in which generation of foreign substances from cut can be suppressed and contamination of a surface of a work can be decreased when performing the processing method using a laser beam on the work made of a polymer material, and a laser processed product. Further, the present invention is to provide a laser beam processing apparatus that is used in the laser beam processing method.

Means for Solving the Problems

To solve the above-mentioned problems, the inventors investigated a laser beam processing method, a laser processed product and a laser beam processing apparatus to solve the conventional problem points so as to find out that the above-mentioned objects can be attained by the following method or device. Thus, the present invention has been made.

That is, in order to solve the above-mentioned problems, the present invention relates to a laser beam processing method for processing a work made of a polymer material using a laser beam, wherein the work is irradiated with a laser beam in a state that the optical axis of the laser beam is tilted in the advancing direction of processing by a prescribed angle with respect to the vertical direction of the work.

When the laser beam is irradiated to a work made of a polymer material, a phenomenon occurs that is similar to an explosion occurring with evaporation due to thermal decomposition of the polymer material, and a gas is generated. In the present invention, the irradiation of the laser beam is performed in a condition that the optical axis of the laser beam is tilted in the advancing direction of processing by a prescribed angle with respect to the vertical direction of the work. By tilting the laser beam in the advancing direction of processing, the space where the gas due to the evaporation can diffuse can be made larger compared to the case of irradiating the laser beam from the vertical direction to the work. That is, the diffusion of the gas into the parallel direction can be decreased, and the gas can be made to diffuse on the upper side of the work depending on the angle of tilting. As a result, also when performing a cutting method by half cut, the surface of the work can be prevented from being contaminated by the gas. Further, because this method is a processing method using a laser beam, the foreign substances from the cut of the work that are generated when cutting with a blade, etc. are not generated.

In the above-described method, it is preferable that the angle between the optical axis of the laser beam and the vertical direction of the work is in the range of 10 to 45°. Setting the angle between the optical axis of the laser beam and the vertical direction of the work to 10° or more makes it possible to further decrease the contamination of the surface of the work. Setting the angle to be 45° or less can makes it possible to prevent an incident angle to the work from being excessively small. As a result, the irradiation of the laser beam at the lens focal point is prevented from becoming difficult, and an improvement in processing accuracy of a portion subjected to process such as cutting can be attempted.

In order to solve the above-mentioned problems, the present invention relates to a laser beam processing apparatus, which is used in the laser beam processing method.

In order to solve the above-mentioned problems, the present invention relates to a laser beam processing apparatus, which is used in the laser beam processing method.

Effect Of The Invention

According to the present invention, because a laser beam is irradiated in a state that the optical axis is tilted in an advancing direction of processing, a surface of a work is prevented from being contaminated by a gas that is generated by evaporation due to thermal decomposition of a polymer material. Because it is a processing method using a laser beam, the foreign substances from the cut that are generated when performing cutting with a blade, etc. are not generated. That is, a laser beam processing method with an improved yield is made possible by the present invention.

EXPLANATION OF THE REFERENCE NUMERALS

1 Work
2 Laser beam
3 Gas

BEST MODE FOR CARRYING OUT THE INVENTION

Figure 1A:
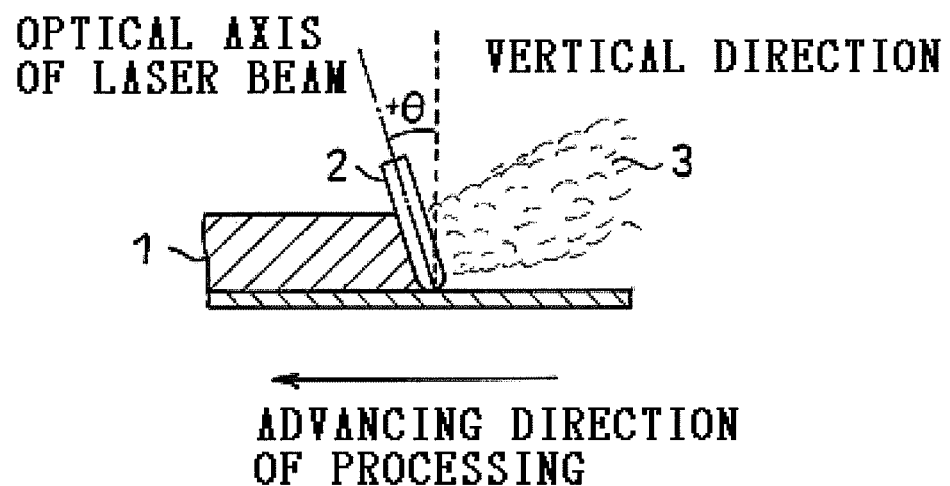
FIG. 1 is a schematic drawing explaining a laser beam processing method according to the embodiment of the present invention, FIG. 1 (a) is a sectional drawing showing a state of irradiating a laser beam onto a work, and FIG. 1 (b) is a drawing of its upper surface view.
Figure 1B:
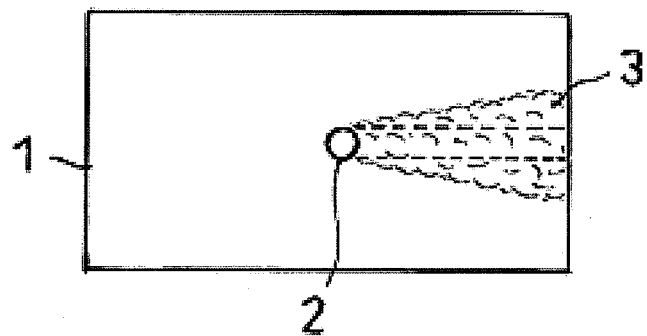
Figure 2:
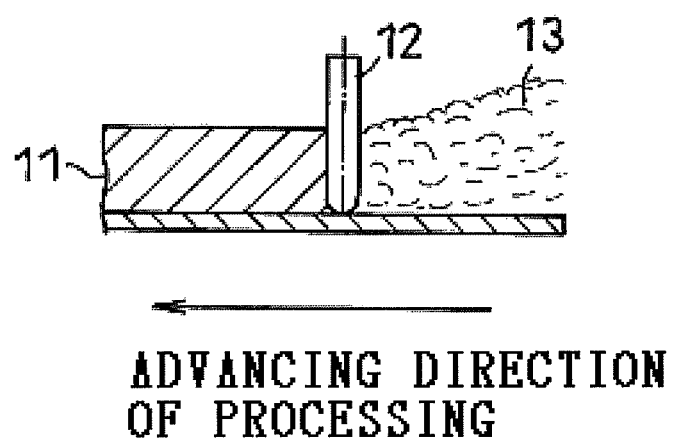
FIG. 2 is a sectional schematic drawing explaining a conventional laser beam processing method.

The embodiment of the present invention is explained below by referring to FIG. 1. FIG. 1 is a schematic drawing explaining a laser beam processing method according to the present embodiment, FIG. 1 (a) is a sectional drawing showing a state of irradiating a laser beam onto a work, and FIG. 1 (b) is a drawing of its upper surface view. The laser beam processing method according to the present invention is a processing method that is performed using a laser beam 2 on a work 1 made of a polymer material, and the laser beam is irradiated in a state that the optical axis of the laser beam 2 is tilted in the advancing direction of processing by a prescribed angle with respect to the vertical direction of the work 1.

The laser processing method of the present invention is suitable for performing a shape processing such as a cut processing, a marking, a hole-opening processing, a groove processing, a scribing processing, and a trimming processing. The present invention is preferably applied to cut processing among these processings.

The cut processing can be applied for any of half cut or full cut. However, the effect of the present invention is exhibited furthermore in the case of a half cut.

When the cut processing is performed by fixing the work 1 and scanning with the laser beam 2, the optical axis of the laser beam 2 is tilted in the same direction as the advancing direction of the laser beam 2. Further, when the cut processing is performed by fixing the laser beam 2 and moving the work 1, the optical axis of the laser beam 2 is tilted in the opposite direction as the advancing direction of the work 1. Accordingly, the optical axis of the laser beam 2 can be tilted in the advancing direction of processing by a prescribed angle with respect to the vertical direction of the work 1. Examples of a method that can be adopted to moving a laser irradiation position along a prescribed processing line include a galvano scan and an X-Y stage scan.

Figure 3:
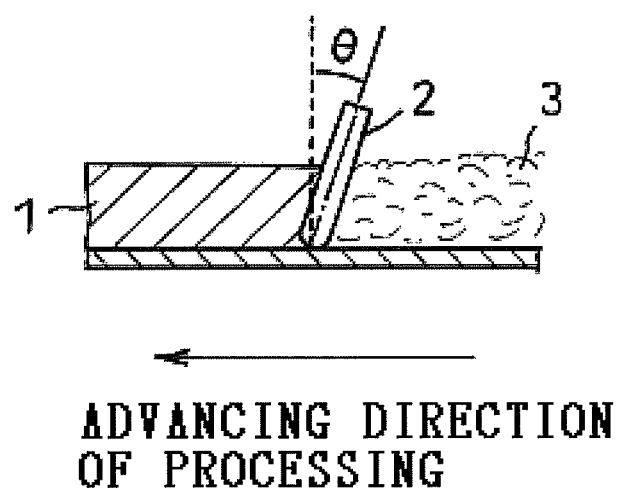
FIG. 3 is a sectional schematic drawing explaining a conventional laser beam processing method.

The angle (the incident angle) θ between the optical axis of the laser beam 2 and the vertical direction of the work 1 is preferably 10 to 45°, and more preferably 15 to 40°. When the angle θ is less than 10°, a gas 3 that is generated diffuses into the direction parallel to the surface of the work 1, and the surface contamination tends to increase. On the other hand, when the angle θ exceeds 45°, the incident angle to the work 1 becomes excessively small. Accordingly, the irradiation of the laser beam 2 at the focus of the lens becomes difficult, and processing accuracy of the cut processing part decreases. Moreover, when the angle θ is negative, that is, when the optical axis of the laser beam 2 is tilted in the direction opposite to the advancing direction of processing, the gas 3 diffuses along the horizontal direction and the contamination on the surface of the work increases (refer to FIG. 3).

Next, the laser beam 2 that is used in the present embodiment is explained. The laser beam 2 is not especially limited, and it can be appropriately selected depending on the processing method. Specific examples include a $CO_2$ laser, a YAG laser, and a UV laser. Among these, the $CO_2$ laser is preferable in the viewpoints that it is applicable over a range of thicknesses of the work, that cracking and breaking of markings do not occur, etc. The output of the laser beam irradiation is in the range of 10 to 800 W, for example, and preferably in the range of 100 to 350 W when cutting the work with one irradiation, and preferably in the range of 50 to 200 W when cutting with two times of irradiation.

The laser beam that is generated from various laser beams described above is basically a Gaussian beam having a maximum value of the beam intensity at the center of the laser spot. Because the beam intensity has a Gaussian distribution, it has a characteristic that the beam intensity is large at the center of the beam spot, and the beam intensity gradually decreases toward the outside from the center. Therefore, when the Gaussian beam is used for cutting the work 1, a component of the work is first decomposed and vaporized and the cutting is initiated at the center of the beam spot. However, the beam intensity becomes small toward the outside of the center of the beam spot, and therefore, the work component is gradually melted and decomposed. At this time, an outward stress is generated when the work component is decomposed and vaporized at the center of the beam spot, and the work component that is melted but not yet decomposed and vaporized at the outside of the center of the beam spot is pushed away toward the outside due to such stress. As a result, a raised portion of the melted component is generated at the cut surface of the work 1. Therefore, when an optical film as the work is integrated into a liquid crystal panel, etc. for example, poor adhesion, etc. are generated at the edge portion of the liquid crystal panel and various optical malfunctions are ultimately generated.

In the present embodiment, the profile of such Gaussian beam is preferably shaped into a rectangular profile. Such a rectangular profile can be made by providing a diffraction optical element to the laser beam generator for example. By controlling the diffraction optical element, the rising angle expressing the beam intensity distribution from the beam edge in the rectangular profile of the laser beam can be appropriately set. For the condition of a laser beam shaped into a rectangular profile, the beam intensity distribution can be expressed with a σ value with the intensity of the center of the laser beam being 1 within a half value width of the rectangular profile. The smaller the σ a value, the sharper the rising of the rectangular profile becomes, and the larger the σ value, the duller the rectangular profile becomes and the closer to a Gaussian beam it becomes.

The concentrated diameter of the laser beam 2 can be appropriately set depending on the type of processing that is performed on the work 1. In the case of cut processing, the cut width approximately matches the concentrated diameter of the laser beam 2. Therefore, by adjusting the concentrated diameter, the cut width can be controlled. The concentrated diameter (the cut width) is normally preferably 50 to 500 μm, and more preferably 150 to 300 μm. When the concentrated diameter is less than 50 μm, there is a case that the cutting speed becomes low. On the other hand, when it exceeds 500 μm, there is a case that deposits are increased.

The power density of the laser beam 2 can be appropriately set depending on the physical properties of the work 1 and the cutting speed in the case of cut processing. The photo-absorption rate of the work 1 is affected by the wavelength of the laser beam 2. The laser beam 2 can oscillate the wavelength from an ultraviolet ray to a near-infrared ray by selecting an oscillation medium or a crystal. Therefore, the processing can be performed effectively with a low power density.

The decomposed and melted substances may be scattered and removed by blowing an assist gas in the same axial direction as the focused laser beam 2 onto a laser beam processing portion with a high flow. Examples of the assist gas include helium, nitrogen, and oxygen.

The work 1 is not especially limited as long as it is made of a polymer material, and a conventionally known substance can be used. Specific examples include various pressure-sensitive adhesive films and an optical film.

The pressure-sensitive adhesive film is not especially limited, and an example includes an acrylic pressure-sensitive adhesive.

The optical film is not especially limited, and an example includes a polarizing plate.

EXAMPLES

Preferred examples of the present invention will be explained in detail hereinafter.

(Pressure-Sensitive Adhesive Film)

The pressure-sensitive adhesive film that was used in the present example has a structure in which a pressure-sensitive adhesive layer is provided between a pair of separators. A PET (polyethylene terephthalate) base having a thickness of 75 μm was used as each separator. An acrylic pressure-sensitive adhesive having a thickness of 200 μm was used as the pressure-sensitive adhesive layer.

(Optical Film)

The optical film that was used in the present example has a structure in which a surface protective film is provided on one surface of a polarizing plate (manufactured by Nitto Denko Corporation) and a separator is laminated on the other surface with the pressure-sensitive adhesive layer in between. The surface protective film consists of a film in which a pressure-sensitive adhesive is applied onto a PET base, and the thickness was about 63 μm. An acrylic pressure sensitive adhesive having a thickness of 23 μm was used as the pressure-sensitive adhesive layer. Each separator consists of a PET base having a thickness of 38 μm. The thickness of the polarizing plate was about 200 μm.

(Cutting Condition by Laser Beam)

The cutting condition of the pressure-sensitive adhesive film was as follows.

Light source: carbon dioxide gas laser beam
Wavelength of the laser beam: 10.6 μm
Spot diameter: 150 μm
Cutting speed: 24 μm/min
Power of the laser beam: 43 W (half cut), 52 W (full cut)

The cutting condition of the optical film was as follows.
Light source: carbon dioxide gas laser beam
Wavelength of the laser beam: 10.6 μm
Spot diameter: 150 μm
Cutting speed: 24 μm/min
Power of the laser beam: 32 W (half cut), 41 W (full cut)

Example 1

In the present example, the laser beam processing was performed using the above-described optical film and pressure-sensitive adhesive film as the work and with half cut and full cut on each as the cutting method. The laser beam was irradiated in a condition that the optical axis of the laser beam is tilted in the advancing direction of cutting with an incident angle of 10° with respect to the vertical direction of the optical film. The result is shown in Table 1.

Comparative Example 1

The cut processing was performed on each optical film and pressure-sensitive adhesive film in the same manner as Example 1 except the incident angle was made to be 0° in Comparative Example 1. The result is shown in Table 1.

Examples 2 to 6

The cut processing was performed on each optical film and pressure-sensitive adhesive film in the same manner as Example 1 except the incident angle was made to an angle shown in Table 1 in each of Examples 2 to 6. The result is shown in Table 1.

(Evaluation Method and Results)

<Range of Contamination (mm)>

The range of the contamination means the maximum width of the range where the decomposed substances from the cut portion are attached in the vicinity of the cut portion after the cut processing of the work.

<Height of Raised portion (μm)>

The height of a raised portion means the maximum height of the raised portion of the melted component that is melted without decomposing and vaporizing and that is extruded to the outside of the cut portion after the cut processing of the work.

<Results>

The adhesion of contaminants was observed on the surface of the pressure-sensitive adhesive film and the optical film after the cut processing. As shown in Table 1, when the laser beam processing is performed at an incident angle of the laser beam being in the range of 10° to 45°, it was confirmed that the contamination on the surface or the backside of the work was decreased. When the incident angle is in the range of 15° to 40°, the amount of smoke that diffuses along the surface of the work (also along the backside in the case of full cut) can be decreased, and the surface or the backside of the work can be maintained in an extremely clean state. Especially when the incident angle is in the range of 20° to 40°, it was found that the range of contamination can be kept to 0.5 mm or less, and at the same time, the height of the raised portion of the melted component can be decreased to 30 μm or less.

On the other hand, because the smoke that is generated by the irradiation of the laser beam diffused along the surface of the work in Comparative Example 1, the surface was extremely contaminated. In the case of Example 6 with the incident angle of 45°, the irradiation of the laser beam at the lens focal point became difficult and the processing accuracy of the cut surface decreased.

When the region of the contamination is 0.5 mm or less, a step of removing the contaminated portion can be omitted after the cut processing, and a large effective area as a product can be taken. When the height of the raised portion of the melted component is 30 μm or less, when installing the optical film in a liquid crystal display device for example, it becomes an advantage in the respect that avoidance of poor adhesion at the edge of the liquid crystal panel can be sufficiently attempted.

TABLE 1

| | | Optical Film | | | | | | Pressure-sensitive adhesive film | | | | | |
|---|---|---|---|---|---|---|---|---|---|---|---|---|---|
| | | Half Cut | | Full Cut | | | | Half Cut | | Full Cut | | | |
| | Incident Angle θ (°) | Contamination Range (mm) Surface | Height of raised portion (μm) Backside | Contamination Range (mm) Surface | Height of raised portion (μm) Surface | Contamination Range (mm) Backside | Height of raised portion (μm) Backside | Contamination Range (mm) Surface | Height of raised portion (μm) Backside | Contamination Range (mm) Surface | Height of raised portion (μm) Backside | Contamination Range (mm) Surface | Height of raised portion (μm) Backside |
| Example 1 | 10 | 0.9 | 22 | 1 | 1.1 | 25 | 30 | 0.85 | 32 | 1.6 | 1.1 | 35.5 | 35.5 |
| Comparative Example 1 | 0 | 1.65 | 21 | 2.1 | 1.05 | 21.5 | 31 | 1.5 | 30.5 | 1.3 | 1.45 | 31 | 33 |
| Examples 2 | 15 | 0.8 | 20 | 0.95 | 0.75 | 22.5 | 26.5 | 0.7 | 31.5 | 0.55 | 0.45 | 31 | 31.5 |
| Examples 3 | 20 | 0.35 | 18.5 | 0.4 | 0.5 | 20.5 | 27.5 | 0.25 | 27.5 | 0.2 | 0.15 | 28 | 28 |
| Examples 4 | 30 | 0.1 | 20.5 | 0.1 | 0 | 20.5 | 27 | 0.25 | 27 | 0.1 | 0.25 | 26.5 | 25.5 |
| Examples 5 | 40 | 0 | 19 | 0.1 | 0 | 21 | 29.5 | 0.4 | 27 | 0.2 | 0.25 | 29.5 | 21 |
| Examples 6 | 45 | 0 | 21 | 0.05 | 0.05 | 23 | 30.5 | 0.25 | 28 | 0.25 | 0.25 | 27.5 | 21.5 |

The invention claimed is:

1. A half-cut laser beam processing method for processing a work made of a polymer material using a laser beam, the method comprising:

partially cutting the work by irradiating the work with a laser beam in a state that the optical axis of the laser beam is tilted in an opposite direction to the advancing direction of the work by a prescribed angle with respect to the vertical direction of the work such that the laser beam is tilted toward a cutting surface of the work, and the angle between the optical axis of the laser beam and the vertical direction of the work is in the range of 20 to 45°;

wherein the processing method is a half cut method, and the work is an optical film, and the optical film is installed in a liquid crystal display device;

wherein the laser beam is a Gaussian beam having a rectangular profile;

wherein polymer material decomposes to form a gas upon irradiation with the laser beam, and a second portion of the polymer material melts without decomposing upon irradiation with the laser beam, and a maximum height of a raised portion of the second portion of the polymer material that is extruded to an outside of a cut portion after the cut processing is 30 μm or less; and wherein the gas diffuses in a direction opposite to the advancing direction of the work.

* * * * *